March 31, 1964 J. A. BRENT ETAL 3,127,276
OSMOTIC TRANSFER OF ORANGE ESSENCE
Filed Oct. 16, 1961
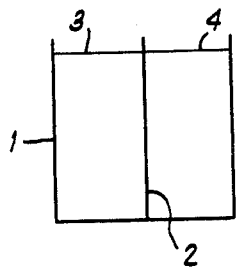
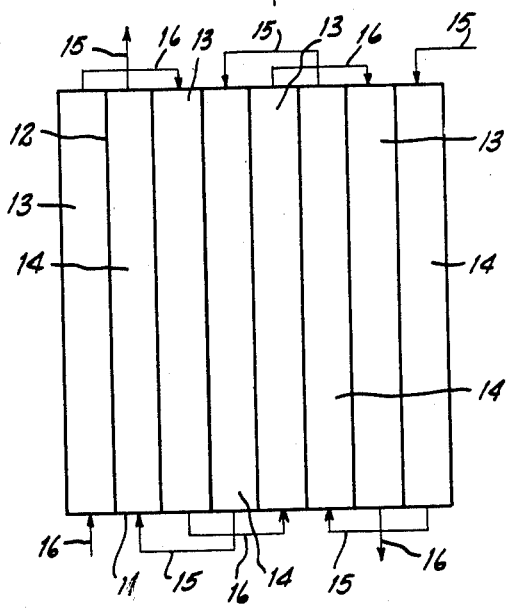
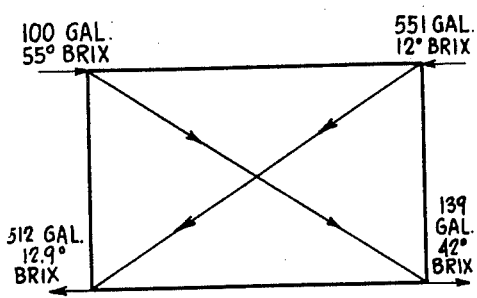
7.1% BY VOLUME OF "FLAVOR LIQUOR" FROM SINGLE STRENGTH JUICE ADDED TO CONCENTRATED JUICE
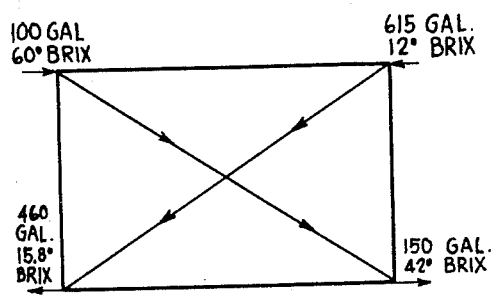
8.9% BY VOLUME OF "FLAVOR LIQUOR" FROM SINGLE STRENGTH JUICE ADDED TO CONCENTRATED JUICE
INVENTORS
JEWELL ALLEN BRENT
WESLEY A. BUCEK
BY
ATTORNEYS

3,127,276
OSMOTIC TRANSFER OF ORANGE ESSENCE
Jewell Allen Brent, Maitland, and Wesley A. Bucek, Winter Park, Fla., assignors to The Coca-Cola Company, Atlanta, Ga., a corporation of Delaware
Filed Oct. 16, 1961, Ser. No. 145,295
6 Claims. (Cl. 99—205)

This invention relates to the production of orange juice concentrate having a high content of flavor essence.

Heretofore it has been common to concentrate orange juice by vacuum concentration in which the water forming part of the juice is removed. Incident to such concentration, much of the essence is removed from the juice so that the concentrate is lacking in the flavor essences which impart the flavor to fresh juice.

Various procedures have been proposed for conserving the essence and it is one of the objects of this invention to provide a simple, effective method for imparting to concentrated orange juice the flavor which is inherent in fresh juice but which is removed during concentration.

Another object is to provide such a method in which the results are achieved easily and simply and with simple, easy to operate equipment.

Other objects and advantages will appear from the following specification and drawings in which FIG. 1 is a diagrammatic view of a cell suitable for carrying out the process;

FIG. 2 is another diagrammatic view of a counter-current apparatus suitable for carrying out the process;

FIG. 3 is a graphic illustration of the results of the process in a given instance, and FIG. 4 is another graphic illustration similar to FIG. 3.

In general, in carrying out this process single strength fresh citrus juice is concentrated by vacuum concentration. During this procedure, the essence which imparts the fresh juice flavoring is removed from the concentrate and may be lost. It consists of various water soluble alcohols, esters, aldehydes and the like, which are quite volatile and generally go off to a large extent with the first 15 to 20% of the liquid removed in concentrating the juice by vacuum concentration.

Such essence is then transferred to the concentrate by osmosis from fresh juice. This is accomplished by placing the concentrate on one side of a permeable membrane and fresh single strength juice on the other side thereof. The difference in osmotic pressure brings about the transfer.

Thereafter, the fresh juice from which the essence has been transferred is subjected to vacuum concentration and this concentrate in turn has an essence fraction transferred by osmosis from another quantity of single strength juice.

The method may be carried out either by a batch or continuous process.

In FIG. 1 there is shown diagrammatically suitable apparatus for carrying out a batch process. A container 1 is divided by a partition 2 which is the porous membrane. This may be regenerated cellulose, cellophane, nitrated cellulose, polyethylene or other suitable materials. The concentrated juice indicated at 3 is placed on one side of the membrane and fresh juice indicated at 4 is placed on the other side of the membrane. The concentrated juice may be at any suitable Brix, such as 55° or 60° and may be the result of vacuum concentration. Other forms of concentration may be employed if desired.

The concentration by vacuum is effected in the usual vacuum concentration equipment in which the water is removed by applying a vacuum to juice in a suitable closed container.

The concentrated juice is generally quite free from the essence or flavor liquor which, as pointed out above, generally consists of water soluble alcohol, aldehyde or the like. The fresh juice, just as it comes from the fruit is placed at 4 and since it has a lower content of dissolved sugar solids, osmotic pressure will cause water containing the flavor liquor or essence or the alcoholic esters and aldehydes to pass through the permeable membrane into the concentrated juice.

Thereafter, the single strength juice from 4 is subjected to vacuum concentration and since much of the essence has been removed by osmosis, the losses of essence through the vacuum concentration are greatly minimized and the flavor essence is conserved.

In FIG. 2 there is shown diagrammatically a counter-current apparatus consisting of a plurality of cells 13 and 14 formed in a container 11 provided with a plurality of partitions 12 comprising porous membranes suitable for osmotic transfer, such as regenerated cellulose, cellophane, nitrated cellulose or polyethylenes.

In the apparatus shown in FIG. 2 the cells 14, for instance, receive the concentrated juice, concentrated as indicated above and the cells 13 contain the single strength fresh juice from which the essence has not been removed. The flow through the cells 14 is indicated by the arrows 15 and the flow through the cells 13 is indicated by arrows 16.

With such an arrangement there is a counter-current flow and the osmotic transfer takes place as indicated above.

The single strength juice from which the essence has been extracted by the apparatus is then passed to the vacuum concentrating equipment.

In FIGS. 3 and 4 the results of the transfer are indicated diagrammatically. For instance, in FIG. 3, 100 gallons of 55° Brix concentrate and 551 gallons of 12° Brix fresh single strength juice are employed.

After the process has been carried out 7.1% or more by volume of the flavor liquor from the single strength juice will be added to the concentrated juice, thus producing a concentrate with materially more essence than before the interchange.

In fact, considerably more essence or flavor then contained in the same volume of single strength juice will be transferred, thus conserving the essence and preventing its loss during the vacuum concentration.

In FIG. 4 is shown diagrammatically the treatment of 100 gallons of 60° Brix concentrate with 615 gallons of 12° Brix fresh juice.

It will be appreciated that in carrying out this method the essence from the fresh juice is transferred to the concentrated juice before vacuum concentration. The essence is thus protected from the rigors and loss due to vacuum concentration.

The invention may be carried out in accordance with the procedures described above but it will be understood that the procedures may be varied since the particular procedures described are described by way of example and illustration without any intention of limiting the invention to the specific form of the invention described above.

What is claimed is:

1. The method of producing full flavored citrus concentrate comprising concentrating citrus juice by vacuum concentration whereby essence is removed therefrom and thereafter imparting essence to said concentrated juice by transfer from fresh juice by osmosis through a permeable membrane by placing the concentrate against said membrane and the fresh juice against the other side thereof whereby osmotic pressure will transfer essence from the fresh juice to the concentrated juice.

2. The method of producing full flavored citrus concentrate comprising concentrating citrus juice by vacuum concentration whereby essence is removed therefrom and thereafter imparting essence to said concentrated juice by transfer from fresh juice by osmosis through a porous membrane by placing the concentrate against said membrane and the fresh juice against the other side thereof whereby osmotic pressure will transfer essence from the fresh juice to the concentrated juice and thereafter concentrating said fresh juice by vacuum concentration.

3. The method of producing full flavored citrus concentrate comprising producing citrus juice concentrate and thereafter imparting essence to said concentrated juice by transfer from fresh juice by osmosis through a permeable membrane by placing the concentrate against said membrane and the fresh juice against the other side thereof whereby osmotic pressure will transfer essence from the fresh juice to the concentrated juice.

4. The method of producing full flavored citrus concentrate comprising concentrating citrus juice by vacuum concentration whereby essence is removed therefrom and thereafter imparting essence to said concentrated juice by transfer from fresh juice by osmosis through a porous membrane by flowing the concentrate along and against said membrane and the fresh juice along and against the other side in a counter-current direction.

5. The method of producing full flavored citrus concentrate comprising concentrating citrus juice by vacuum concentration whereby essence is removed therefrom and thereafter imparting essence to said concentrated juice by transfer from fresh juice by osmosis through a porous membrane by flowing the concentrate along and against said membrane and the fresh juice along and against the other side thereof whereby osmotic pressure will transfer essence from the fresh juice to the concentrated juice.

6. The method of producing full flavored fruit juice concentrate comprising producing fruit juice concentrate and thereafter imparting essence to said concentrated juice by transfer from fresh juice by osmosis through a porous membrane by placing the concentrate against said membrane and the fresh juice against the other side thereof whereby osmotic pressure will transfer essence from the fresh juice to the concentrated juice.

References Cited in the file of this patent
UNITED STATES PATENTS

| | | |
|---|---|---|
| 2,116,920 | Wickenden | May 10, 1938 |
| 2,453,109 | MacDowell | Nov. 9, 1948 |
| 2,512,513 | Zahn | June 20, 1950 |